United States Patent [19]
Klink

[11] Patent Number: 6,006,868
[45] Date of Patent: Dec. 28, 1999

[54] SYSTEM FOR MONITORING BRAKE STATUS ON A RAIL CAR

[75] Inventor: Douglas D. Klink, Weatherby Lake, Mo.

[73] Assignee: Technical Services and Marketing Inc., Kansas, Mo.

[21] Appl. No.: 08/749,177

[22] Filed: Nov. 14, 1996

[51] Int. Cl.⁶ .............................. F16D 66/00; B60Q 1/00
[52] U.S. Cl. .............................. 188/1.11 W; 188/1.11 E; 340/453
[58] Field of Search .................. 188/1.11 R, 1.11 W, 188/1.11 L, 1.11 E; 303/122.03, 7, 22.6, 22.7; 340/453

[56] References Cited

U.S. PATENT DOCUMENTS

| | | | |
|---|---|---|---|
| 952,070 | 3/1910 | Cota | 188/1.11 R X |
| 3,651,457 | 3/1972 | Sprouse | 188/1.11 E X |
| 3,662,863 | 5/1972 | Dombeck | 188/1.11 |
| 3,689,882 | 9/1972 | Dessailly | 340/53 |
| 3,848,932 | 11/1974 | Lewis | 188/195 |
| 4,344,138 | 8/1982 | Frasier | 105/61 |
| 4,569,559 | 2/1986 | Fulmer . | |
| 4,693,485 | 9/1987 | Kamei et al. | 280/6 R |
| 4,757,300 | 7/1988 | Sebalos | 188/1.11 L X |
| 4,801,179 | 1/1989 | Hintner | 303/22.2 |
| 4,824,195 | 4/1989 | Rees | 303/22.7 |
| 4,826,259 | 5/1989 | Biegel | 303/22.2 |
| 4,984,853 | 1/1991 | Thioux et al. | 303/22.8 |
| 5,039,174 | 8/1991 | Beacon et al. | 303/22.7 |
| 5,052,761 | 10/1991 | Thony | 303/22.6 |
| 5,090,779 | 2/1992 | Kramer | 188/1.11 L X |
| 5,109,343 | 4/1992 | Budway | 73/490 |
| 5,207,299 | 5/1993 | Feldmann | 188/79.55 |
| 5,285,190 | 2/1994 | Humphreys et al. | 188/1.11 L X |
| 5,348,226 | 9/1994 | Heiniger et al. | 239/73 |
| 5,372,221 | 12/1994 | Jalbert | 188/1.11 L X |
| 5,403,072 | 4/1995 | Kilian et al. | 303/3 |
| 5,410,109 | 4/1995 | Tarter et al. | 177/136 |
| 5,433,296 | 7/1995 | Webberley | 188/1.11 L |
| 5,438,516 | 8/1995 | Neubauer et al. | 364/426.01 |
| 5,497,325 | 3/1996 | Mine | 280/707 |
| 5,520,265 | 5/1996 | Kobayashi et al. | 188/1.11 |
| 5,544,057 | 8/1996 | Matsuoka . | |
| 5,572,187 | 11/1996 | Williford | 188/1.11 E X |
| 5,701,974 | 12/1997 | Kanjo et al. | 188/1.11 R |
| 5,738,416 | 4/1998 | Kanjo et al. | 303/122.03 X |

FOREIGN PATENT DOCUMENTS

| | | | |
|---|---|---|---|
| 106131 | 4/1984 | European Pat. Off. | 188/1.11 R |
| 1241775 | 8/1971 | United Kingdom | 188/1.11 E |

*Primary Examiner*—Mark T. Le
*Assistant Examiner*—Jeffrey Woller
*Attorney, Agent, or Firm*—Hovey, Williams, Timmons & Collins

[57] ABSTRACT

A rail car brake monitoring apparatus (10) for monitoring the status of a brake system (12) on a rail car is disclosed. The monitoring apparatus (10) includes a transmitter and receiver unit (52) and a controller (54). The transmitter and receiver unit (52) generates and directs a transmitted signal towards a component of the brake system (12) and receives a reflected signal from the component. The controller (54) analyzes the transmitted and received signals to generate a position signal representative of a position of the component for use in monitoring or controlling the brake system (12).

28 Claims, 1 Drawing Sheet

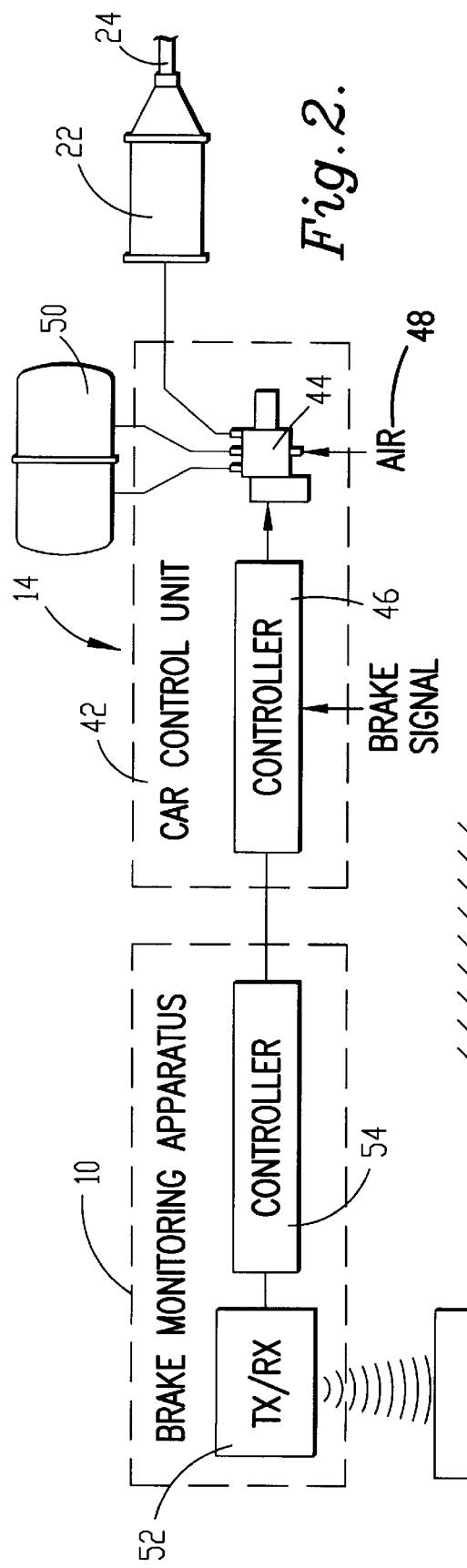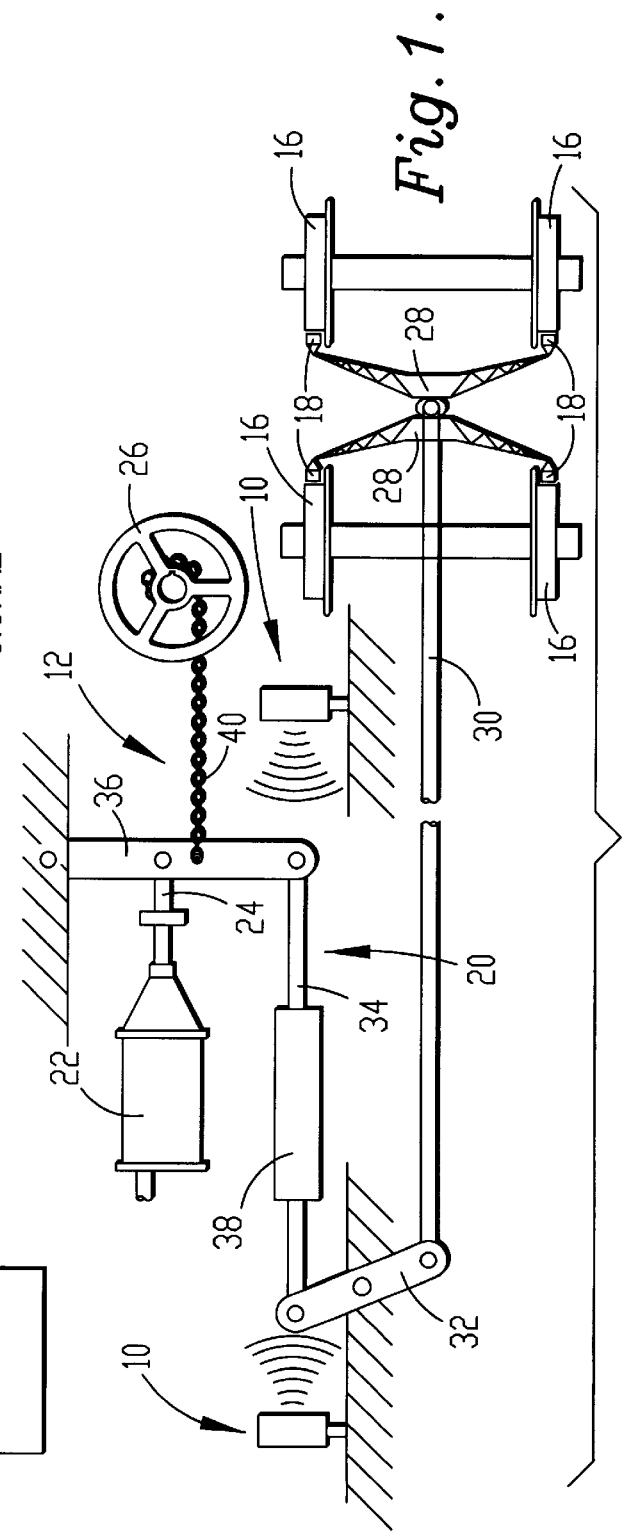

SYSTEM FOR MONITORING BRAKE STATUS ON A RAIL CAR

BACKGROUND OF THE INVENTION

1. Field of the Invention

The present invention relates to rail car braking systems, and more particularly to a rail car brake monitoring apparatus for monitoring the status of a rail car brake system.

2. Description of the Prior Art

Conventional rail car brake systems include a plurality of brake shoes, a mechanical linkage assembly coupled with the brake shoes for pressing the brake shoes against the rail car's wheels when the linkage is shifted to a braking position, and a pneumatically-operated brake cylinder that, when actuated, shifts the mechanical linkage to its braking position. Rail car brake systems also include a manually-operated hand brake in each rail car that shifts its mechanical linkage to the braking position. The hand brakes are applied when the train is "parked" for preventing the rail cars from moving while not coupled with a locomotive for a time. The hand brakes are then manually released when the locomotive is once again coupled and the brake systems recharged so that the brake systems in the rail cars are once again controlled by their pneumatic brake cylinders.

Unfortunately, train operators often omit releasing the hand brakes in all of the rail cars before the train is moved. Thus, the brake shoes remain in contact with the rail car's wheels while the train is moving, causing rapid and premature wear of the brake shoes and wheels and sometimes even rail car derailment.

Rail car brakes also sometimes fail to release when their mechanical linkages get stuck or when their cylinders fail. These failures also result in brake shoe and wheel wear and possible derailment.

Another limitation of conventional rail car brake systems is that they do not include means for monitoring the wear on their brake shoes. Since the brake shoes often wear rapidly, operators must frequently visually inspect the brake shoes. Those skilled in the art will appreciate that such visual inspections are time consuming and imprecise. Complicating the problem, the brake shoes on different rail cars wear at different rates due to many factors including the amount of weight in the rail cars. Thus, operators cannot accurately predict when brake shoes will wear out and therefore must frequently inspect all the brake shoes on all of the rail cars regardless of the age of the brake shoes.

SUMMARY OF THE INVENTION

The present invention solves the prior art problems discussed above and provides a distinct advance in the art of rail car brake systems. More particularly, the invention provides a monitoring apparatus for monitoring the status of a brake system on a rail car to determine whether the rail car's hand brake has been left on and to determine whether the brakes have malfunctioned for other reasons. The monitoring apparatus also monitors the status of the brake system to determine the extent of wear of the brake shoes and other components of the brake system.

The rail car brake monitoring apparatus of the present invention broadly includes a transmitter and receiver unit and a controller. The transmitter and receiver unit is operable for generating and directing a transmitted signal towards a component of the brake system and for receiving a reflected signal from the brake system component. The monitored component may be any component of the rail car brake system including the piston of the brake cylinder, the hand brake, the mechanical linkage connecting the piston and hand brake to the brake shoes, or the brake shoes themselves.

The controller is coupled with and responsive to the transmitter and receiver unit for analyzing the transmitted and received signals and for generating a position signal representative of the position of the monitored component. The position signal is used to monitor the status of the brake system or to control the operation of the brake system. For example, the controller may deliver the position signal to a display for displaying the actual position of the monitored component. Then, if the monitored component is not in its correct position, the train operator may correct the problem.

The rail car brake monitoring apparatus may also be coupled with an electronic brake controller operable for controlling the actuation of the rail car's brake system in response to entered brake commands. The controller of the monitoring apparatus transmits the position signal to the brake controller, and the brake controller uses the position signal to adjust the braking force applied to the braking system. For example, the brake controller may be programmed to compare the received position signal to the entered brake commands to ensure that the brake system is functioning properly. If the brake controller determines that the brake component is not in the position corresponding to the entered brake command, the brake controller may activate an alarm or automatically compensate for the discrepancy by applying more or less braking force to the brake system.

The rail car brake monitoring apparatus of the present invention provides numerous advantages. For example, the monitoring apparatus allows an engineer or other train operator to quickly and easily monitor whether the rail car's hand brake has been released or whether the brakes have failed to release for other reasons. This prevents premature wear to the brake shoes and wheels of the rail car and prevents possible derailment caused by unreleased brakes. The monitoring apparatus also allows an operator to quickly and easily monitor the amount of wear of the brake shoes without visually inspecting the brake shoes.

Additionally, when coupled with an electronic brake controller, the monitoring apparatus provides position signals to the controller that may be used for automatically controlling the operation of the brake system to compensate for conditions such as brake pad wear or improperly aligned brake components.

BRIEF DESCRIPTION OF THE DRAWING FIGURES

A preferred embodiment of the present invention is described in detail below with reference to the attached drawing figures, wherein:

FIG. 1 is a schematic view of a rail car brake monitoring apparatus constructed in accordance with a preferred embodiment of the invention shown coupled with a conventional rail car brake system; and FIG. 2 is a block diagram of the monitoring apparatus shown coupled with an electronic brake controller.

DETAILED DESCRIPTION OF THE PREFERRED EMBODIMENTS

FIG. 1 illustrates preferred rail car brake monitoring apparatus 10 shown operably coupled with brake system 12 of a conventional rail car. As illustrated in FIG. 2, monitoring apparatus 10 is preferably configured for use with electronic rail car brake controller 14.

Brake system 12 brakes wheels 16 of a conventional rail car and broadly includes a plurality of brake shoes 18 for pressing against the wheels, mechanical linkage generally referred to by the numeral 20 for pressing the brake shoes against the wheels, pneumatically-operated brake cylinder 22 having shiftable piston 24 for shifting the linkage between braking and unbraking positions, and manually-operated hand brake 26 for shifting the linkage between its braking and unbraking positions independently of the brake cylinder.

Linkage 20 includes brake beams 28 connected to brake shoes 18, brake rigging rod 30 connected between the brake beams and lever 32, and brake rigging rod 34 connected between lever 32 and lever 36. When lever 36 is shifted away from cylinder 22 or toward hand brake 26 as viewed from FIG. 2, it shifts the other components of linkage 20 for pressing brake shoes 18 against wheels 16. Linkage 20 may also include slack adjuster 38 coupled with either rigging rod 30 or 34 for adjusting the linkage to compensate for wear of brake shoes 18.

Piston 24 of cylinder 22 is attached to one end of lever 36 for shifting the lever between its braking and non-braking positions upon receiving braking commands from brake controller 14. Hand brake 26 is also coupled with lever 36 by chain 40 for shifting the lever to its braking position independently of brake cylinder 22 when the hand brake is manually turned.

Rail car brake controller 14 controls the actuation of brake system 12 by controlling the amount of air delivered to brake cylinder 22. Brake controller 12 is preferably an electronic brake system controller such as the Model No. P.N. 081-50101 controller manufactured by Technical Service and Marketing, Inc., of Kansas City, Mo. Brake controller 14 is described in more detail in U.S. Pat. No. 5,335,974, hereby incorporated by reference.

As illustrated in FIG. 2, brake controller 14 generally includes a head end unit (not shown) positioned in the locomotive of the train and a car control unit 42 positioned in each rail car. The head end unit includes entry buttons or keys and associated control circuitry for receiving braking commands. An engineer initiates rail car braking by activating the appropriate control circuitry on the head end unit. The head end unit translates the engineer's braking commands into a target brake cylinder pressure and transmits this target brake cylinder pressure to car control unit 42. Car control unit 42 receives the target brake control pressure and applies the appropriate amount of pressure to its respective brake cylinder 22.

Car control unit 42 broadly includes at least one pneumatic valve 44 and controller 46. Valve 44 is positioned between a source of pressurized air 48, air reservoir tank 50 and brake cylinder 22.

Controller 46 is electrically coupled with the head end unit for controlling the position of valve 44 in response to the brake signals transmitted from the head end unit. Controller 46 controls the amount of air delivered to brake cylinder 22 by valve 44 for shifting linkage 20 between its braking and non-braking positions. Each car control unit 42 also includes other controls circuitry, pneumatic valves and air pressure sensors described in detail in the '974 patent referenced above.

Monitoring apparatus 10 is electrically coupled with brake controller 14 and positioned adjacent a component of brake system 12 for monitoring the status of the brake system by continuously monitoring the position of the component at any point through a full range of motion of the component. Monitoring apparatus 10 may monitor the position of any component of braking system 12, but as illustrated in FIG. 1, it is preferably positioned for monitoring the position of either lever 36 or 32.

When monitoring apparatus 10 is positioned adjacent lever 36 to monitor the position of lever 36, it monitors the status of brake system 10 before slack adjuster 38. This effectively monitors the position of piston 24 or hand brake 26 to sense whether the cylinder has failed to activate or release brake system 10 or whether the hand brake has been released.

When monitoring apparatus 10 is positioned adjacent lever 32 to monitor the position of lever 32, it monitors the status of brake system 12 after slack adjuster 38. This effectively monitors the movement required to press brake shoes 18 against wheels 16 to determine the wear on the brake shoes. For example, if brake shoes 18 have worn out, the top of lever 32 will need to shift a greater distance leftward as viewed from FIG. 1 to press the brake shoes against wheels 16.

Monitoring apparatus 10 may also be positioned adjacent piston 24 of brake cylinder 22 or hand brake 26 to directly monitor the position of these components. Similarly, monitoring apparatus 10 may be positioned adjacent brake shoes 18 for directly monitoring the position of the brake shoes.

Returning to FIG. 2, monitoring apparatus 10 broadly includes transmitter and receiver unit 52 and controller 54. Transmitter and receiver unit 52 and controller 54 may be a single component or may be separate components electrically coupled together.

Transmitter and receiver unit 52 is operable for generating and directing a transmitted signal or pulse towards the monitored component of brake system 12 and for receiving a reflected signal from the component. Transmitter and receiver unit 52 is preferably an ultrasonic type device but may also include other types of position or distance sensors such as an optical sensor, acoustic sensor, radar sensor or linear optical sensor having a position sensitive detector.

Controller 54 is coupled with and responsive to transmitter and receiver unit 52 for analyzing the transmitted and received signal and for generating a position signal representative of the position of the monitored component. In preferred forms, controller 54 measures the time interval between the generation of the transmitted signal and the receipt of the reflected signal from the monitored component. Controller 54 converts the measured time interval to a position or distance signal representative of the position of the monitored component. Controller 54 is preferably a programmable microprocessor but may also include other conventional electronic control devices.

The position signal generated by monitoring apparatus 10 may be used to control the operation of brake system 12 or to merely monitor the status of the brake system. For example, controller 54 may deliver its generated position signals to brake controller 14 for use in controlling the operation of brake system 12. Brake controller 14 may be programmed to compare the position signal to the brake commands entered into the head end unit by the engineer. If brake controller 14 determines that the monitored brake component is not in the position corresponding to the entered brake commands, the brake controller may activate an alarm or automatically compensate for the discrepancy. For example, if monitoring apparatus senses that lever 32 or 36 is in its braking position when it should be in its unbraking position, brake controller 14 may compensate for the error.

Controller 54 may also deliver its position signals to a display or other control device positioned in view of the engineer or other train operator to display the actual position of the monitored component. Then, if the monitored component is not in its correct position or if wear has caused the alignment or position of the monitored component to change, the engineer may correct the problem. For example, the monitoring apparatus allows an engineer or other train operator to quickly and easily monitor whether the rail car's hand brake has been released or whether the brakes have failed to release for other reasons. This prevents premature wear to the brake shoes and wheels of the rail car and prevents possible derailment caused by unreleased brakes. The monitoring apparatus also allows an engineer or other train operator to quickly and easily monitor the amount of wear of the brake shoes without visually inspecting the brake shoes.

Although the invention has been described with reference to the preferred embodiment illustrated in the attached drawing figures, it is noted that equivalents may be employed and substitutions made herein without departing from the scope of the invention as recited in the claims. For example, although the preferred monitoring apparatus 10 uses transmitted and received signals to sense the position of a monitored component of brake system 12, it could also use mechanical-type position sensors.

Having thus described the preferred embodiment of the invention, what is claimed as new and desired to be protected by Letters Patent includes the following:

1. A rail car brake monitoring apparatus for monitoring the status of a brake system on a rail car, said apparatus comprising:

transmitting means for generating and directing a transmitted signal towards a component of the brake system;

receiving means for receiving a reflected signal from said component; and control means, coupled with said transmitting means and said receiving means, and responsive to said transmitted and reflected signals, for generating a position signal representative of a position of said component for use in monitoring the status of the brake systems.

2. The rail car brake monitoring apparatus as set forth in claim 1, in combination with the brake system, and the brake system including a brake controller for controlling the activation of the brake system, said control means including delivery means for delivering said position signal to the brake controller for use in controlling the actuation of the brake system.

3. The rail car brake monitoring apparatus as set forth in claim 1, said control means including measuring means for measuring a time interval between the directing of said transmitted signal towards said component and the receipt of said reflected signal from said component, and converting means for converting said time interval to said position signal.

4. The rail car brake monitoring apparatus and brake system combination set forth in claim 2, further in combination with the rail car, and the rail car including a plurality of wheels, the brake system including a plurality of brake shoes for pressing against the wheels, a mechanical linkage assembly coupled with the brake shoes for pressing the brake shoes against the wheels when shifted to a braking position, a brake cylinder having a shiftable piston for shifting the mechanical linkage to the braking position when the brake cylinder is actuated by the brake controller, and a hand brake for shifting the mechanical linkage to the braking position independently of the brake cylinder and the brake controller.

5. The combination as set forth in claim 4, said component of said brake system being said piston of said brake cylinder.

6. The combination as set forth in claim 4, said component of said brake system being said hand brake.

7. The combination as set forth in claim 4, said component of said brake system being said mechanical linkage.

8. The combination as set forth in claim 4, said component of said brake system being said brake shoes.

9. The rail car brake monitoring apparatus as set forth in claim 1, said transmitting means and said receiving means including an ultrasonic distance sensor operable for transmitting and receiving ultrasonic signals.

10. The rail car brake monitoring apparatus as set forth in claim 1, said transmitting means and said receiving means including an optical distance sensor operable for transmitting and receiving optical signals.

11. The rail car brake monitoring apparatus as set forth in claim 1, said transmitting means and said receiving means including an acoustic distance sensor operable for transmitting and receiving acoustic signals.

12. The rail car brake monitoring apparatus as set forth in claim 1, said transmitting means and said receiving means including a radar distance sensor operable for transmitting and receiving radar signals.

13. The rail car brake monitoring apparatus as set forth in claim 1, said transmitting means and said receiving means including a linear optical sensor having a position sensitive detector.

14. The rail car brake monitoring apparatus as set forth in claim 3, said control means including a microprocessor.

15. The rail car brake monitoring apparatus as set forth in claim 1, wherein said transmitting means, receiving means, and control means are a single component.

16. A rail car brake control system in combination with a brake system, and in further combination with a rail car, said system comprising:

a brake controller controlling the actuation of the brake system; and a brake monitoring apparatus, coupled with said brake controller and monitoring the operation of the brake system, said brake monitoring apparatus including-sensing means for sensing a position of a component of the brake system, and control means, coupled with and responsive to said sensing means, for generating an actual position signal representative of said position of said component and for delivering said position signal to said brake controller for use in controlling the actuation of the brake system.

17. The combination as set forth in claim 16, said sensing means including transmitting means for generating and directing a transmitted signal towards said component of the brake system and receiving means for receiving a reflected signal from the component, said control means including measuring means for measuring a time interval between the directing of said transmitted signal towards said component and the receipt of said reflected signal and converting means for converting said time interval to said position signal.

18. The combination as set forth in claim 16, the rail car including a plurality of wheels, the brake system including a plurality of brake shoes for pressing against the wheels, a mechanical linkage assembly coupled with the brake shoes for pressing the brake shoes against the wheels when shifted to a braking position, a brake cylinder having a shiftable piston for shifting the mechanical linkage to the braking position when the brake cylinder is actuated by the brake controller, and a hand brake for shifting the mechanical linkage to the braking position independently of the brake cylinder and the brake controller.

19. The combination set forth in claim 18, said component of said brake system being said piston of said brake cylinder.

20. The combination set forth in claim 18, said component of said brake system being said hand brake.

21. The combination set forth in claim 18, said component of said brake system being said mechanical linkage.

22. The combination set forth in claim 18, said component of said brake system being said brake shoes.

23. The combination as set forth in claim 16, said sensing means further including receiving means and transmitting means, and said transmitting means and said receiving means including an ultrasonic distance sensor operable for transmitting and receiving ultrasonic signals.

24. A rail car brake control system for operating a brake system of a rail car, said system comprising:
   a brake controller operable for controlling the actuation of the brake system; and
   a brake monitoring apparatus, coupled with said brake controller, for monitoring the operation of the brake system, said brake monitoring apparatus including-
      transmitting means for generating and directing a transmitted signal towards a component of the brake system,
      receiving means for receiving a reflected signal from the component, and
      control means coupled with said transmitting means and said receiving means, said control means including measuring means for measuring a time interval between the directing of said transmitted signal towards said component and the receipt of said reflected signal, converting means for converting said time interval to a position signal representative of an actual position of said component, and delivering means for delivering said position signal to said brake controller for use in controlling the actuation of the brake system.

25. A rail car brake monitoring apparatus for monitoring the status of a rail car brake system on a rail car, said apparatus comprising:
   sensing means for sensing the position at substantially any point through a full range of motion of a component of the brake system; and
   control means, responsive to said sensing means, for generating a position signal representative of the position of said component for use in monitoring the status of the brake system.

26. The apparatus according to claim 25 in combination with the rail car brake system, the brake system including a slack adjuster and the component, and wherein the component is positioned before the slack adjuster to monitor a status of the brake system before the slack adjuster.

27. The apparatus according to claim 25 in combination with the rail car brake system, the brake system including a slack adjuster and the component, and wherein the component is positioned after the slack adjuster to monitor a status of the brake system after the slack adjuster.

28. The apparatus according to claim 26 in combination with the rail car brake system, the brake system including a slack adjuster and another component, and wherein the other component is positioned after the slack adjuster to monitor the status of the brake system after the slack adjuster.

* * * * *